US011163826B2

(12) United States Patent
Qualiano (10) Patent No.: US 11,163,826 B2
(45) Date of Patent: Nov. 2, 2021

(54) METHOD AND SYSTEM FOR GENERATING ELEMENTS OF RECORDED INFORMATION IN RESPONSE TO A SECONDARY USER'S NATURAL LANGUAGE INPUT

(71) Applicant: Daniel Joseph Qualiano, Monroe, NY (US)

(72) Inventor: Daniel Joseph Qualiano, Monroe, NY (US)

( * ) Notice: Subject to any disclaimer, the term of this patent is extended or adjusted under 35 U.S.C. 154(b) by 0 days.

(21) Appl. No.: 16/805,824

(22) Filed: Mar. 1, 2020

(65) Prior Publication Data

US 2021/0271708 A1 Sep. 2, 2021

(51) Int. Cl.
*G06F 16/732* (2019.01)
*G06F 16/75* (2019.01)
*G06F 16/25* (2019.01)
*G06F 16/23* (2019.01)

(52) U.S. Cl.
CPC ...... *G06F 16/7343* (2019.01); *G06F 16/2379* (2019.01); *G06F 16/252* (2019.01); *G06F 16/75* (2019.01)

(58) Field of Classification Search
CPC .............................. G06F 16/7343; G06F 16/75
See application file for complete search history.

(56) References Cited

U.S. PATENT DOCUMENTS

| | | | | | |
|---|---|---|---|---|---|
| 6,944,586 | B1 * | 9/2005 | Harless | ................. | G06Q 90/00 703/23 |
| 2007/0261071 | A1 * | 11/2007 | Lunt | ..................... | G06Q 10/10 725/13 |
| 2008/0168523 | A1 * | 7/2008 | Ansari | ................. | H04W 12/065 725/131 |
| 2011/0283210 | A1 * | 11/2011 | Berger | .................. | G06F 3/0481 715/765 |
| 2013/0226578 | A1 * | 8/2013 | Bolton | ............... | G06Q 10/1057 704/235 |
| 2015/0287092 | A1 * | 10/2015 | Samadani | .......... | G06Q 30/0269 705/14.66 |
| 2020/0227033 | A1 * | 7/2020 | Gustman | ................. | G10L 15/22 |
| 2021/0073272 | A1 * | 3/2021 | Garrett | .................. | G06F 40/169 |

\* cited by examiner

*Primary Examiner* — Richard L Bowen
(74) *Attorney, Agent, or Firm* — Daniel Joseph Qualiano (57) ABSTRACT

The invention relates to a computerized method and computer-based system for generating elements of recorded information for a secondary user in response to the secondary user's natural language input. The recorded information could be in the form of, for example, video, audio, audio-visual, text files, or other recordable media. The method and system of the invention permit a secondary user to access, in real time, information of an original source (e.g., allows a descendant to obtain a multimedia response stored by or on behalf of an ancestor) via a computer network, with the response being accessible via a television, audio player, Bluetooth or wireless device, or any other electronic and digital system. The access to such information can be initiated by the secondary user's input provided through use of, for example, voice response technology, including speech recognition and natural language software. The ability to access the information as recorded by the original source increases the perceived and, hopefully the actual, level of validity and accuracy, while also simulating, with multiple secondary user communication entries and responses, a 'face-to-face conversation' between the secondary user and the original source.

14 Claims, 5 Drawing Sheets

METHOD AND SYSTEM FOR GENERATING ELEMENTS OF RECORDED INFORMATION IN RESPONSE TO A SECONDARY USER'S NATURAL LANGUAGE INPUT

FIELD OF INVENTION

The invention relates generally to a computerized method and computer-based system for generating elements of recorded information for a secondary user in response to the secondary user's natural language input.

COPYRIGHT NOTICE

A portion of the disclosure of this patent application contains material that is subject to copyright protection. Noting the confidential protection afforded non-provisional patent applications prior to publication, the copyright owner hereby authorizes the U.S. Patent and Trademark Office to reproduce this document and portions thereof prior to publication as necessary for its records. The copyright owner otherwise reserves all copyright rights whatsoever.

BACKGROUND

As artificial intelligence continues to grow into every aspect of people's lives—making everyday activities faster, easier, and more convenient—traditional methods of preserving family history and other historical data are becoming obsolete. The younger and more technologically savvy generations, prone to the use of multimedia technology, are increasingly losing interest in looking through photo albums, diaries, journals, or home videos. Conversely, the older and more 'technology-challenged' generations are not as savvy in their use of technology. As a result, for example, the unique and special people that came before, who have historical information about themselves and others, are less frequently capturing their 'histories' and thus there is more likelihood that their information is being forgotten and memories of them are left to fade away. Further, when these 'original sources' of information are no longer available, later generations lose the opportunity to get information 'directly from the source' with the benefits of viewing the sources as he or she shares the 'history', noting the importance of perceiving not just what is said but also how something is said (e.g., observing body language and facial expressions).

Looking at a specific situation, as an example of an existing need, there have been few innovations in the methods in which, or in the systems through which, family histories (other than genealogy and genetic testing) are captured and other historical data is preserved. The existing methods and systems typically provide limited 'snapshot' information about individuals and do not readily support more in-depth interactive discovery and understanding of ancestors and others that could be the original source of historical information. The existing methods and systems fail to create the often-desired unique and intimate experience for family, friends and future generations to see, hear, and learn about, for example, their loved ones, directly from those individuals. The existing method and system also appear to fall short in their capabilities to give future generations a deep learning of an individual with real time understanding of their personality, character, and mannerisms (the kind of learnings that would ordinarily be achieved in face to face meetings).

With the foregoing describing some of the shortfalls of the prior methods and systems, the present inventions (both the method and the system) are designed and have been developed to address these considerations and other challenges in the prior art. Accordingly, the present inventive method and system are intended to overcome shortcomings in the existing art by providing processes and means through which an interested secondary user can retrieve, in real time, through the use of natural language, stored historical information as recorded by or on behalf of the original source of the information.

SUMMARY OF THE INVENTION

The method of the present invention includes, in general, the initial step of storing in a database recorded information. In a preferred embodiment, the information would later in time be considered historical. The method further includes the step of receiving the natural language input from a secondary user (such as audible questions and commands) provided to access corresponding responsive recorded information in the database (in a preferred embodiment, seeking that portion of the recorded historical information that is responsive). With the stored recorded information and the secondary user communication available, the next step would include the relating—in real time—of secondary user communication with the stored information (e.g., correlating the audible question with the audiovisual recording in which the answer to the question can be found). Once a relationship has been established, the following step would be the generating of a form of the stored information, based upon the related input (e.g., producing an audiovisual clip that includes the person seen on the clip providing an answer to the inputted question). The final step of a general embodiment of the present inventive method would be the making available to the secondary user the generated form of information (e.g., displaying the audiovisual clip on a screen with the sound 'voicing' the answer produced through connected speakers).

The system of the present invention includes, in its general embodiment, a computer processor, information storage, an input receiving element, and an output element. Each of the foregoing components is electronically connected directly or indirectly, although the connection could be remote (e.g., through networked computers). By way of elaboration, the computer processor is capable of relating as corresponding elements of information (e.g., stored historical data) in a database with later received secondary user communication (e.g., natural language questions or commands) and of generating a form of the elements (e.g., an audiovisual clip) that is dictated by the input (e.g., that is responsive to a question posed by the secondary user). The information storage, which is electronically connected with the computer processor, contains the database in which recorded information from the original source of the information can be stored. The elements of the information in the database are categorized in a searchable configuration. The input receiving element, also electronically connected with the computer processor, provides the means through which the secondary user can provide input that can be associated with the elements of the information. The final element in this general embodiment of the invention, the output element, is the means through which the generated form of the elements (e.g., a responsive audiovisual clip) can be presented to and experienced by the secondary user.

The ability to access the information—in particular as recorded by the original source—increases the perceived (and hopefully the actual) level of validity and accuracy while also supporting the proximate simulation of a 'conversation' between the secondary user and the original source (akin to a 'face-to-face' conversation). Mindful of the foregoing, the various embodiments of the present invention are useful in varying ways. For example, the hiring process currently practiced by corporations can be made more efficient by cutting down prescreening time and expenses through the use of this invention, accessing prerecorded answers of hiring candidates. Education can benefit through the possibility of preserving personal histories of the most innovative minds of the time and passing them on for students of the future to engage these individuals in virtual conversation. Alzheimer's patients may benefit in their struggle for memory recall therapy, as well as Traumatic loss therapy patients. The embodiments of this invention can also impact the lives of millions with terminal illness in their quest to pass on their memory to their children and grandchildren in a truly personal way, never before possible.

DETAILED DESCRIPTION OF THE EMBODIMENTS

Figure 1:
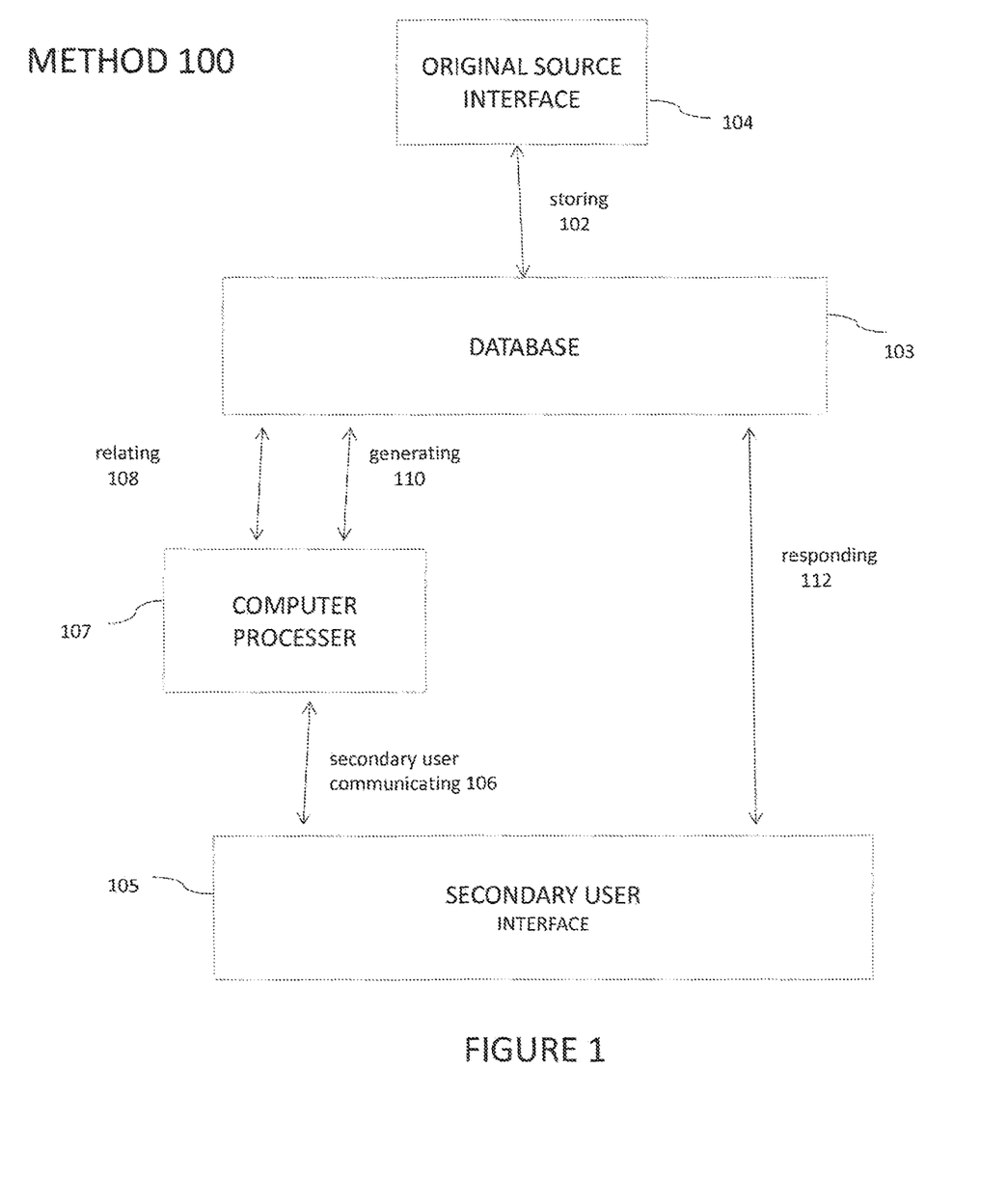
FIG. 1 shows a schematic illustration of the general steps of a specific embodiment of the present computerized method for generating elements of information, along with components usable in that depicted method.

FIG. 1 shows a specific embodiment of the present computerized method 100 for generating elements of information. In this particular embodiment, the method 100 starts with the storing of information from original source interface 104 into database 103 (e.g., storing step 102). The information is stored in a recorded form. Original source interface 104, e.g., the mechanism through which it is recorded and then stored, could be, for example, a mobile phone, a computer or any other electronic device, now known or to be known, that is capable of recording information for electronic storage. One of ordinary skill in the art would realize that original source interface 104 could also receive, as part of the present inventive method, information and other data that can be displayed for, heard through and audio player or otherwise usable by the original source. The information could be video, sounds, audiovisual elements, documents, and other similar forms of content. Along with or included as part of the particular elements of information are preferably indicia that can be used to categorize the elements. This categorization of the elements can be used to, for example, locate the elements within the database 103, in particular, in cases in which the elements of the information are categorized in a searchable configuration.

A further step of the process, as seen in FIG. 1, is the receiving of secondary user communication that can be associated with the elements of the information (e.g., secondary user communicating step 106). Secondary user interface 105 is an example of a device that could be used to ingest the secondary user input for method 100. Similar to the knowledge regarding original source interface 104, one of ordinary skill in the art would realize that secondary user interface 105 could also receive, as part of the present inventive method, information and other data that can be displayed for, heard through an audio player, or otherwise used by the secondary user. This secondary user communication could take on a variety of forms. In one preferred embodiment, the secondary user communication could be in the form of audible questions spoken into a microphone element that is electronically connected to a computer processor. Ideally, computer processor 107 would be able to analyze the audible questions (the example here) to establish elements of the questions that can be preferably used to ascertain any action sought by the question (input). One of ordinary skill in the art would realize that the secondary user communication could alternatively be, for example, an audible command. Likewise, computer process 107 would be used to initiate certain actions based upon the applicable command.

FIG. 1 also shows another step—the relating of the elements to the corresponding input (e.g., relating step 108). In one particular embodiment of the inventive method, the secondary user input, as it is processed by computer processer 107, is evaluated and essentially, if and as possible, placed in relation with the appropriate elements stored in database 103. An example of such relating step 108 would be computer processor 107 evaluating secondary user communication that is in the form of a question and using the applicable aspects of the question to identify elements in database 103 that, when provided to the secondary user, would constitute a form of an answer to the question posed. By way of further example, the question could be "what color were your eyes?" and the computer processor, based upon identity of the person about which the secondary user is posing the question, could relate the question to a video clip in which an answer to the question has been captured.

After the input is related to the applicable element of information, the next step in the process would be the generating of a form of the elements that is dictated by the input (e.g., generating step 110). For example, generating step 110 might include the duplication of a certain set of information elements and placing them in a sequence suggested by the secondary user input. Focusing particularly on the question/video combination of secondary user communication and information elements, one skilled in the art would realize that this step could result, for example, in the generation and creation of a set of video clips displayable on, or heard through audio player functionality through, the appropriately equipped secondary user interface 105, that are in essence responsive to the questions posed.

A last step in the particular embodiment of the invention shown in FIG. 1 would be the step of making available to the secondary user the generated form of the elements (e.g., responding step 112). This action could be accomplished by, for the example in which the elements include audiovisual clips, the performance of the responsive clip on a mobile phone or computer screen (each, a version of secondary user interface 105), with the accompanying sound.

Figure 2:
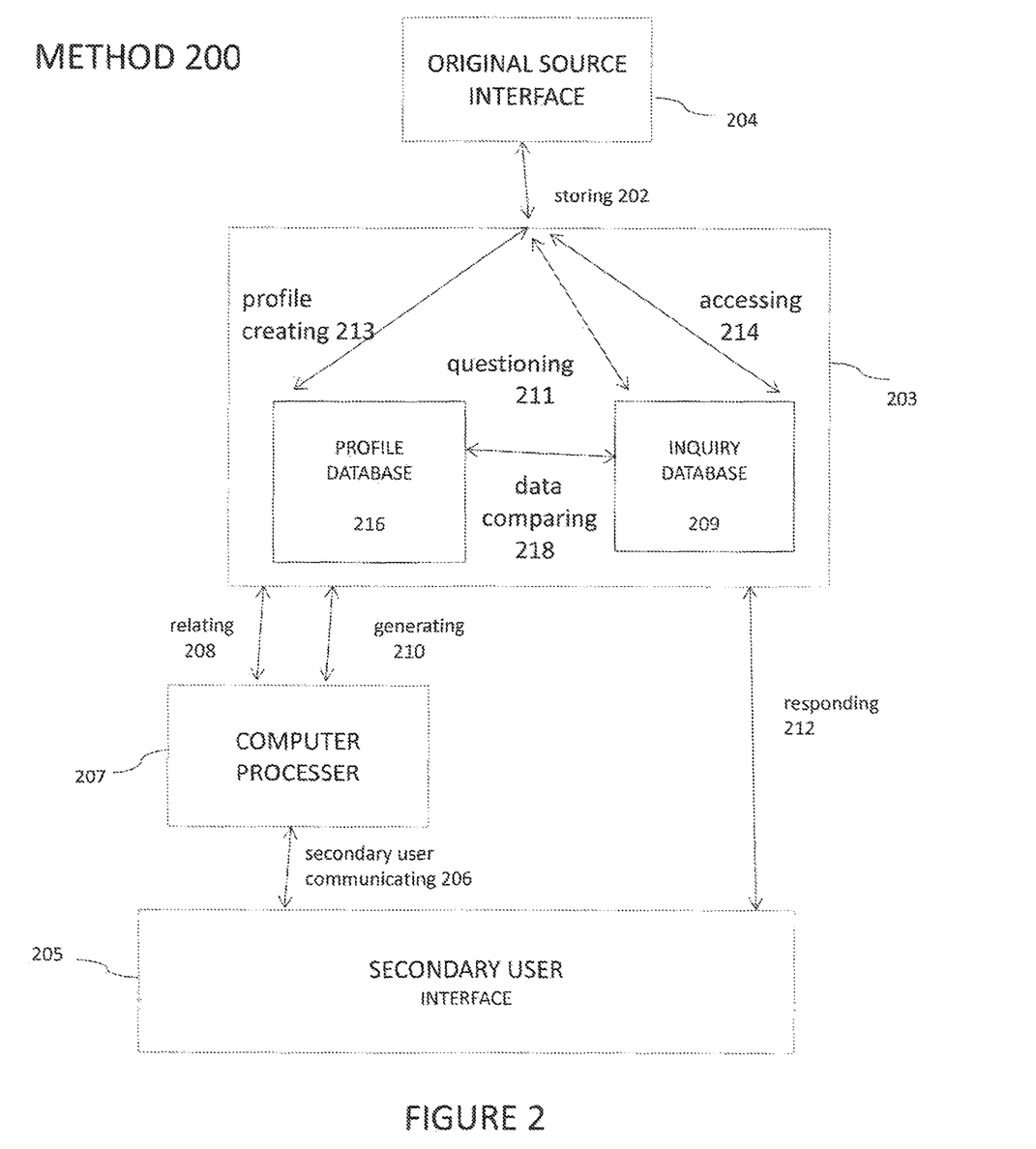
FIG. 2 shows a schematic illustration with the steps of FIG. 1 and with additional steps relating to, among other things, accessing a database, creating questions, and using preloaded questions.

A different embodiment of the inventive method is shown in FIG. 2 (with certain steps similar to the steps shown in FIG. 1 and corresponding numbered). In this particular embodiment with elaboration on storing step 202, original source interface 204 can be used to access (e.g., accessing step 214) a database ("Inquiry" database 209) of pre-loaded questions, requests, commands or combinations of the foregoing. The original source can also create and add (using for example, original source interface 202 to facilitate the addition) his or her own personal questions, requests, commands, or combinations and add them to the "Inquiry" database if desired (e.g., question creation step 211). With access to the "Inquiry" database, this original source can, also using, for example, original source interface 202, respond to the preloaded and/or newly created questions, requests, and/or commands in the form of a video recording, audio recording, and/or text response (with, for example, answering of preloaded questions via accessing step 214 or answering of newly created questions via the combination of question creation step 211 and accessing step 214). These completed response recordings can then be stored in the same database ("Inquiry" database 209) and/or in a separate database (such as, for example, "Profile" database 216). "Profile" database 216 could house, for example, the original sources created applicable questions, requests, commands, or combinations, the recorded responsive information of the original source and other information unique to the original source (such as, for example, a list of secondary users that are authorized to access information from and/or about the original source). Some or all of the foregoing information could be loaded into "Profile" database 216 through, for example, profile creating step 213. In any case, the responses would be electronically associated with the applicable questions, requests, commands, or combinations. "Inquiry" database 209 and "Profile" database 216 function together as database 203, an enhanced version of database 103 in FIG. 1, with comparison, as needed, of the information in "Inquiry" database 209 and "Profile" database 216 through data comparing step 218.

With the entries of the responses stored in the database 203, a secondary user, at a later time, can communicate (e.g., secondary user communication step 206) through secondary user interface 205, in real time, with computer process 207 to access and otherwise interface with the completed original source's responses in database 203. Such communication could include, for example, the secondary user inputting a question, request, command or combination of the foregoing in natural language through voice recognition technology (including, without limitation, speech recognition and natural language software) by pressing a microphone button and simply speaking. If through the performance of relating step 208 it is established that the secondary user's question, request, or command resembles, as evaluated by computer processor 207, any question, request, command or combination thereof in database 203—housing the original source's responses (previously created and stored by the original sources), then matching is performed (e.g., generating step 210), whereby the matching video, audio, or text response is associated with the secondary user's communication and the result(s) are queued for and displayed, heard and otherwise accessed via secondary user interface in real time (e.g., responding step 212 is performed). The secondary user can continue presenting questions, requests, commands or combinations of the foregoing (e.g., repeatedly performing secondary user communicating step 206) and receiving via the performance of responding step 212 the appropriate responsive clips in a "question—answer" format. The experience of a live video chat call is simulated through this question and answer action and reaction between the live questions being asked by the secondary user and the previously recorded video answers stored in the applicable database by the original source at an earlier time.

Figure 3:
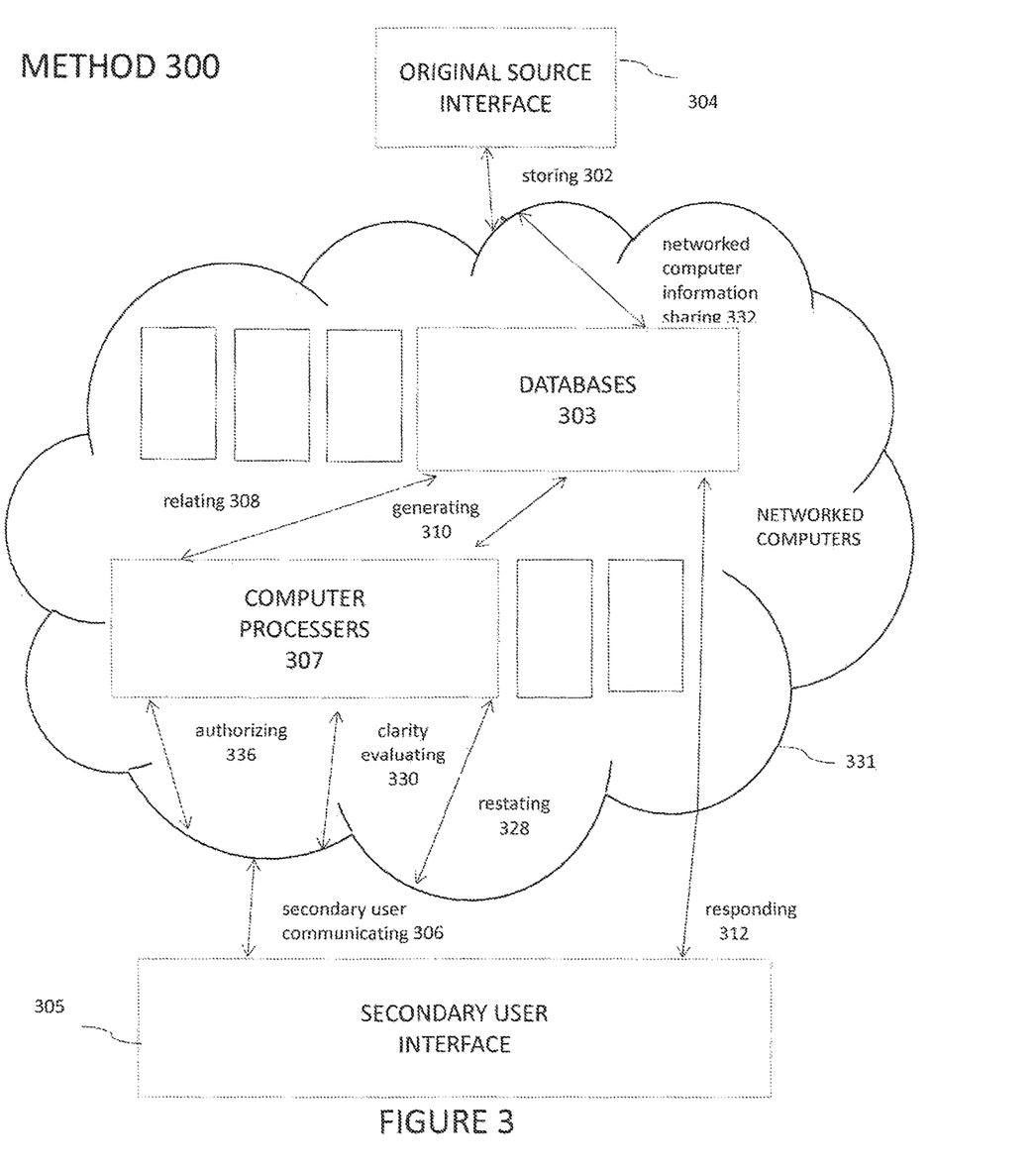
FIG. 3 shows a schematic illustration with the steps of FIG. 2 and with additional steps relating 'rephrasing', clarity and accuracy evaluation, storing of information on networked computers and authorization.

FIG. 3 shows an enhanced embodiment of the present inventive method 300 (an elaboration of the method shown in FIG. 2 and with the corresponding numbers) inclusive of an enhancement to secondary user communicating step 306—a step of requesting a 'rephrasing' (e.g., restating step 328) of the questions, requests, commands or combinations thereof is the computer processor evaluating the resemblances of the questions, requests, commands or combinations thereof of the original source is not sufficient to relate the original source's responses to the secondary user's input (e.g., clarity evaluating step 330). One of ordinary skill in the art would recognize the value of storing the original source's responses categorized in a searchable configuration to improve the efficiency and effectiveness of the evaluation for resemblances.

In the embodiment of the present inventive method 300 shown in FIG. 3, database 303, in which information is stored, is accessible through original source interface 304 via networked computers 331 (i.e., via, for example, networked computers information storing step 332). Alternatively, database 303 could be housed in or otherwise an electronically connected part of one or more personal area computers, system area computers, local area network (LAN) computers, metropolitan area networks, wide area networks, storage area computers, campus area computers, or various combinations of the foregoing. The source of the information being recorded for entry into database 303 could be, for example, mobile devices and it is also conceivable, without limitation, that the storing of the original source's originally sourced information elements could be entered through one or more stand-alone computers, analog tape recorders, digital tape recorders, DAT recorders, hard disk recorders, portable recorders, pre-recorded DVDs or CDs, listening-enabled TVs, holographic recorders, and devices with similar functionality. Further, other video forms that could be captured in the practice of the inventive method include, for example, analog video, tape video, digital 8, mini DV, DVD, solid state and semiconductor.

FIG. 3 also shows authorizing step 336, through which secondary user is given approved permission to interface with and access information provided by the original source. With respect to the secondary user input, the form of the input shown in the FIG. 3 could be a recorded audio element, with computer processer 307, embedded in one or more of networked computers 331, having, for example, voice recognition capabilities. Additionally and/or conversely, the secondary user communication could be in the form of text, video, still images (in formats such as bmp., gif., jpg., pdf., png., etc.), animation, graphics, visual objects and visualizations, and holographic elements. When the input is in the form of a recorded audio element, that element may include, for example, discernible words that can be associated with the elements of the information. Preferably, the words are in verbal and in natural language. Further, the forms of discernible words are preferred in the processing to associate the words with the elements of the information, including, for example (as suggested above), questions, commands, requests, statements, comments, demands, utterances and full speech.

An important aspect in the efficiency in practicing the present inventive method is, in the performance of relating step 308, the evaluation of the relationship between the information from the original source and the secondary user's input. Accuracy valuation, performed by computer processor 307, compares the resemblance between the elements introduced by the original source and the later secondary user. The level of accuracy, which one of ordinary skill in the art would envision to be adjustable to desired levels, would be set based upon the accuracy needed to maximize the appropriateness of the response and to minimize the need to refine the input (e.g., lowering the number of times questions need to be restated to get to the appropriate response). When computer process 307 detects that the secondary user communication is a set of discernible words that constitute commands, computer processor 307 seeks to establish if there is, for example, more than a fifty percent (50%) chance that the elements of the information associated with commands are responsive to the commands. If the percentage chance is at least fifty percent (50%), then the method continues moving to the initiation of generating step 310 and the responding step 312. When computer processor 307 detects (in accuracy evaluation step 340) that the secondary user communication is in the form of a question and there is, for example, more than a sixty-five percent (65%) chance that the elements of the information associated with discernible questions are responsive to the questions, then the responsive information is generated (e.g., generating step 310) and made available to the secondary user (e.g., responsive step 312). The evaluation of the input and the elements of the information can be accomplished by the matching via, for instance, queries, strings, algorithmic elements, patterns, the fuzzy approach, percentages or combinations of the foregoing. In a further embodiment, responses to questions are associated with elements of the information that are videos. These associations can be made through the use of, for example, search engines and comparisons with various inputs, with such inputs being, for instance, primary and secondary data, binary code, internally stored information, information from removable storage devices, data in cloud storage, or audio, voice recognition, and face recognition data in format.

With further respect to the step of relating the elements and the input (e.g., relating step 308), this step includes, for example, the creation of associations performed by computer processor 307 capable of receiving the secondary user communication and electronically connected to the database. The electronic connection may be established via one or more, for example, wireless interfaces, Bluetooth interfaces, ethernet hardwires, fiber optics, radio waves, sound waves, microwaves, satellites, infrared systems, Morse code and hardwires. In a preferred embodiment of the inventive method, the computer process is also capable of generating (via generating step 310) a form of the elements that is dictated by the input. Such input could include, for example, voice commands, finger commands, photo recognition, joystick motions, keyboard entries, touch screen received input, stylus pen movements, infrared scanning, barcode scanning and other means of generating and providing input. Further, the secondary user communication is preferably, in certain embodiments of the present invention, in the form of audible questions and the generated elements are video clips that constitute responses to the audible questions. Here, the input could take the form of, for example, voice recall, key command entry to generate a response, data recall, data search and photo matching. Further, the generated video clips are made available to the secondary user (via responding step 312) via the practice of certain embodiments of the present inventive method through screens. Such screens could be on or part of mobile device, such as cellphones and tablets, laptops, projector-illuminated surfaces, computer monitors and screens, smart watches, 3D goggle headsets, and wearable video monitors.

Figure 4:
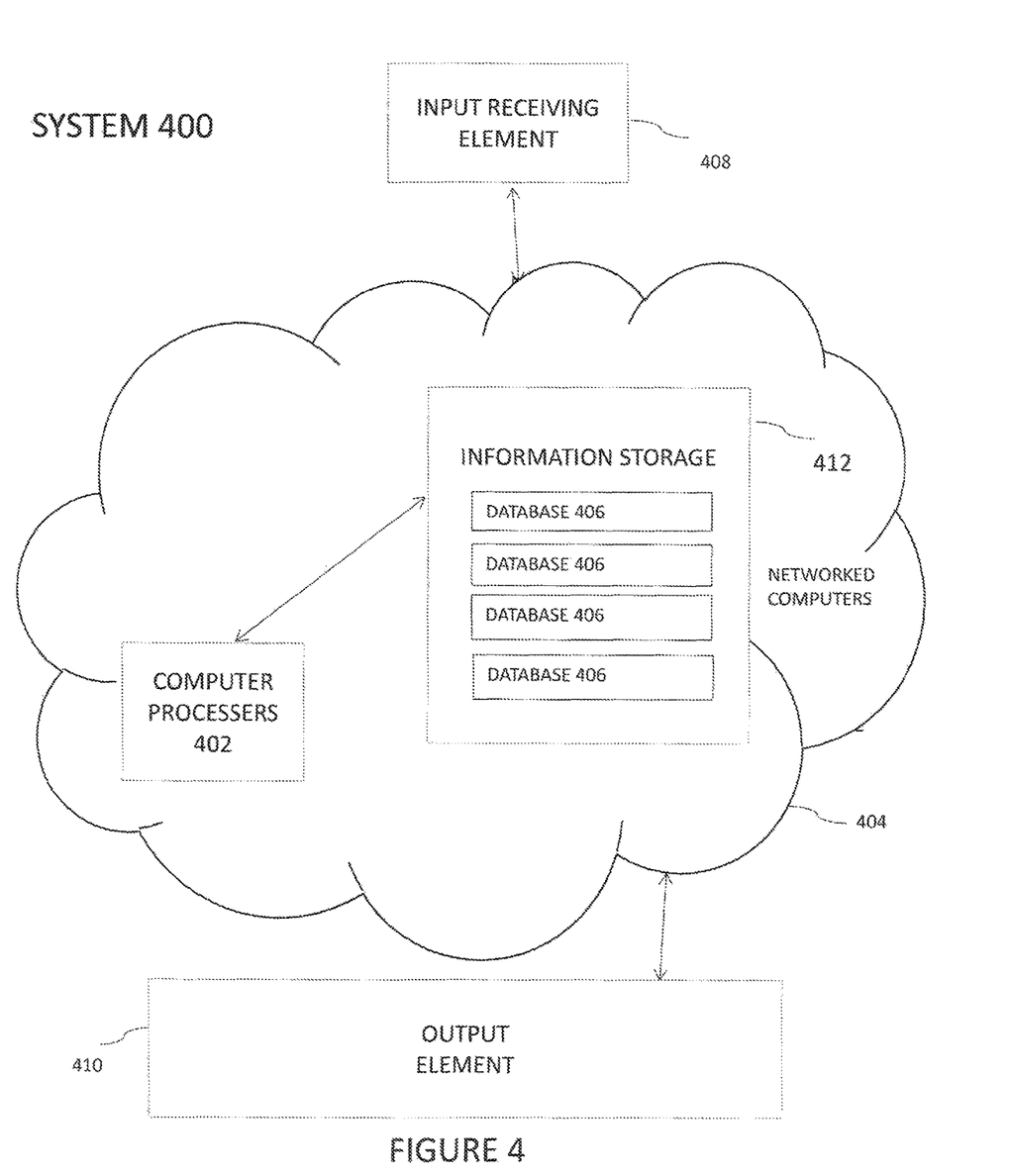
FIG. 4 is a diagram depicting a preferred embodiment of the present inventive computer-based system.

FIG. 4 shows a preferred embodiment of the present inventive computer-based system 400. This system is capable of generating elements of information for a secondary user in response to the secondary user's input. The components of the system, in a general embodiment, include computer processor 402. Computer processor 402 is electronically connected with and internal to networked computers 404. Computer processor 402 is capable of relating as corresponding elements of information in database 406 with later received input and of generating a form of the elements that is dictated by the input. Information storage 412, electronically connected with computer processor 402, houses database 406. Database 406 can store information recorded from a source and has the capacity to maintain the elements of the information categorized in a searchable configuration.

Input receiving element 408 is also electronically connected to the computer processor. Through input receiving element 408, the secondary user of the system can provide input that can be associated with the elements of the information. Input receiving element 408 has the functionality of a microphone and, in particular embodiments of the present inventive system, could be, for example, a microphone on a computer, a wireless microphone, a handheld microphone, a camera microphone, a cell phone microphone, a headset microphone, or any other component through which sound can be recorded.

Output element 410 is the component through which the generated form of the elements can be experienced by the secondary user. Through output element 410, the secondary user can receive and experience the generated information that is responsive to his or her input. Output element 410 includes, for example, a screen upon which video elements can be displayed and a speaker through which audio elements can be produced (e.g., a device with audio player functionality). Such screens could be or be a part of, for example, note pads, tablets, iPads, computers, cellphones, television monitors, cameras, echo show connected screens, google home connected screen, Amazon Alexa connected screens, touch screen mirrors, and other devices that have a screen and speaker-equivalent functionality.

Figure 5:
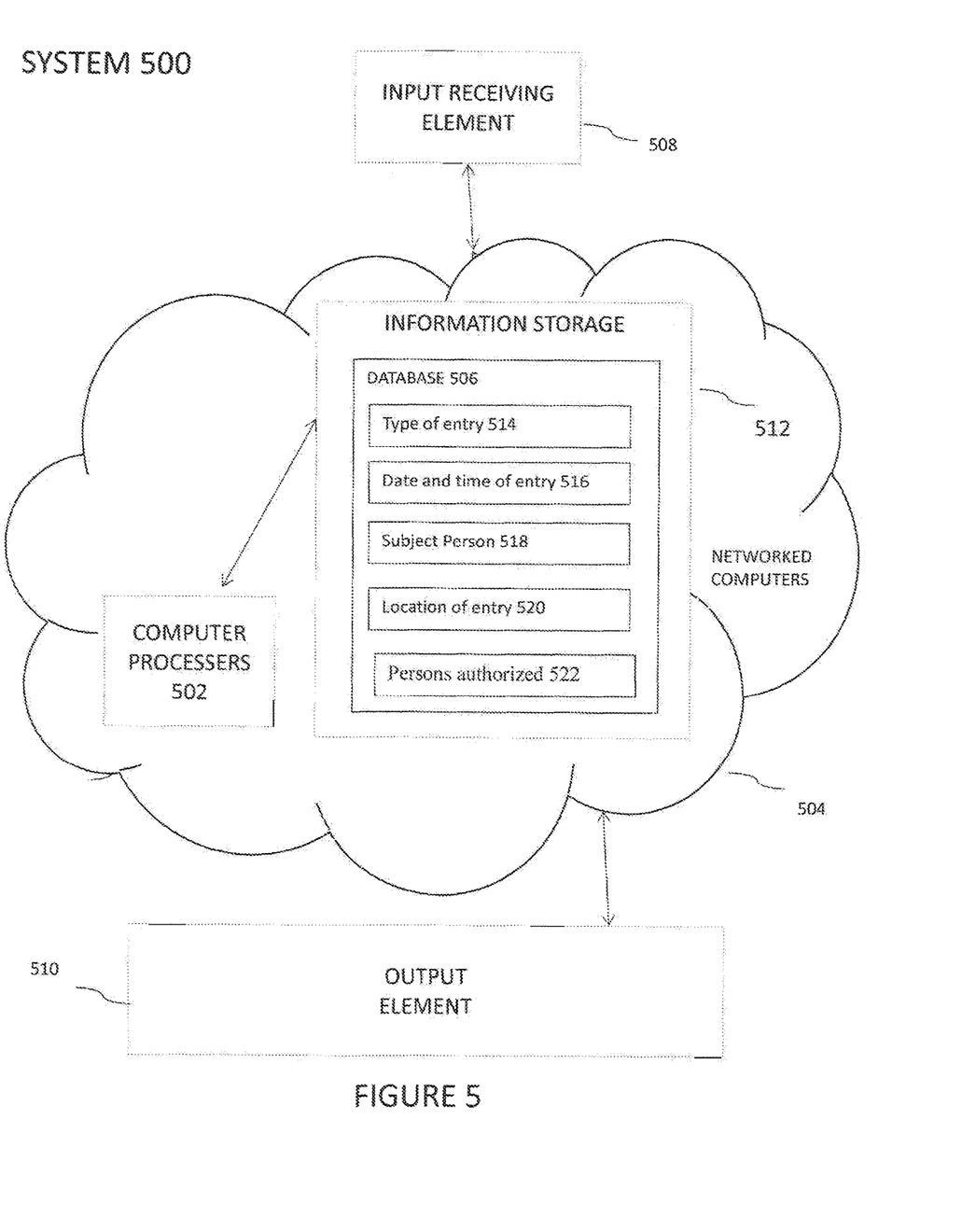
FIG. 5 is the diagram of FIG. 4 with the additional showing of, among other things, details regarding the database.

In FIG. 5, computed-based system 500 includes the components of FIG. 4 (numbered correspondingly for FIG. 5), and shows further the following categories of database 506: type of entry 514, date and time of entry 516, subject person 518, location of entry 520, and persons authorized to access the information 522. In certain embodiments of the present inventive system, the later received input can be in the form of, for example, questions, requests, commands, demands, statements, utterances, and prompts. The forms of the elements generated through the use of the present inventive system include, for example, video clips, Gif files, Mov files, MPEG 2 files, MP4 files, 3GP files, M4v files, Avi files, Flv files, Wmv files and RTSP (Real time streaming protocol) files. Additionally, the source of the stored information recorded could be, for example, a mobile device, usd cards, thumb drives, cell phones, portable hard drives, external drives and other means of storing elements of data (e.g., cloud and other online storage).

Additional Thoughts

The foregoing descriptions of the present invention have been provided for the purposes of illustration and description. It is not intended to be exhaustive or to limit the invention to the precise forms disclosed. Many modifications and variations will be apparent to the practitioner of ordinary skill in the art. Particularly, it would be evident that while the examples described herein illustrate how the inventive system may look and how the inventive process may be performed. Further, other elements and/or steps may be used for and provide benefits to the present invention. The depictions of the present invention as shown in the exhibits are provided for purposes of illustration.

The embodiments were chosen and described in order to best explain the principles of the invention and its practical application, thereby enabling others of ordinary skill in the art to understand the invention for various embodiments and with various modifications that are suited to the particular use contemplated.

What is claimed is:

1. A computerized method for generating elements of information for a secondary user in response to the secondary user's input, comprising the steps of:
   storing in a database information recorded from an original source, wherein the original source elements of the information are categorized in a searchable configuration and such elements are responses to preloaded questions;
   receiving from the secondary user natural language input that can be associated with the responses to the preloaded questions, wherein the secondary user input is in the form of recorded audio elements and such recorded audio elements include discernable words;
   relating the responses to preloaded question to the secondary user natural language input by evaluating the secondary user natural language input that is in the form of a question and using applicable aspects of the secondary user natural language input to identify and associate the applicable aspects of the secondary user natural language input with the original source elements of information, wherein the relating is performed by a computer processor capable of receiving the secondary user natural language input and electronically connected to the database and wherein the database in which the original source elements of information is accessible via networked computers;
   processing of the discernible words, using the applicable aspects thereof, by comparing the resemblance of the discernable words and the preloaded questions, to establish that there is at least a fifty percent (50%) chance that the applicable aspects of the discernible words resemble elements of the preloaded questions;
   generating the responses to the preloaded questions that are dictated by the secondary user natural language input based upon the at least fifty (50%) chance that there is a resemblance the secondary user natural language input and the preloaded questions associated with the response; and
   making available to the secondary user the responses to the preloaded questions generated through the processing of the discernable words and the establishment of at least a fifty percent (50%) chance of resemblance between the elements of the discernable words and the preloaded questions.

2. The method of claim 1 wherein the source of the information recorded is a mobile device.

3. The method of claim 2 wherein the information recorded is in the form of a video.

4. The method of claim 1 wherein there is at least a sixty-five percent (65%) chance that the preloaded questions associated with the original source elements of the resemble the discernible words of the secondary user.

5. The method of claim 4 wherein responses to questions are associated with elements of the information that are videos.

6. The method of claim 1 wherein the computer process is also capable of generating a form of the elements that is dictated by the secondary user input.

7. The method of claim 6 wherein the secondary user input is in the form of audible questions and the generated elements are video clips that constitute responses to the audible questions.

8. The method of claim 7 wherein the generated video clips are made available to the user via a screen on a mobile device.

9. A computer-based system for generating elements of information for a secondary user in response to secondary user input comprising:
   a computer processer, electronically connection with networked computers, capable of
   relating corresponding elements of information in a database with later received input and of generating a form of the elements that is dictated by the secondary user input;
   receiving the secondary user natural language input, wherein the responses to preloaded questions can be related to the secondary user natural language input by evaluating the secondary user natural language input that is in the form of a question and using applicable aspects of the secondary user natural language input to identify original source elements of information,
   processing of the discernible words, using the applicable aspects thereof, by comparing the resemblance of the discernable words and the preloaded questions,
   establishing that there is at least a fifty percent (50%) chance that the applicable aspects of the discernible words resemble elements of the preloaded questions; and
   generating the responses to the preloaded questions that are dictated by the secondary user natural language input based upon the at least fifty (50%) chance that there is a resemblance;
   information storage that is electronically connection with the computer processor, in which a database can store information recorded from an original source and in which databases of the original source elements of the information can be categorized in a searchable configuration, with such elements being responses to preloaded questions;
   an input receiving element, electronically connection with the computer processor, through which the secondary user can provide natural language input that can be associated with the responses to the preloaded questions, wherein the secondary user input is in the form of recorded audio elements and such recorded audio elements include discernable words; and
   an output element through which the responses to the preloaded questions generated through the processing of the discernable words and the establishment of at least a fifty percent (50%) chance of resemblance can be by made available to the secondary user.

10. The computed-based system of claim 9 wherein the information in a database can be categorized by its type, date of entry, person of subject, and persons authorized to access the information.

11. The computer-based system of claim 9 wherein the form of the elements generated is in video clips.

12. The computer-based system of claim 9 wherein the source of the stored information recorded is a mobile device.

13. The computer-based system of claim 9 wherein the input receiving element has the functionality of a microphone.

14. The computer-based system of claim 9 wherein the output element includes a screen upon which video elements can be displayed and a speaker through which audio elements can be produced.

\* \* \* \* \*